May 3, 1949.  L. H. MOOMAW  2,468,993
MOTION-PICTURE PROJECTOR
Filed Oct. 17, 1946  5 Sheets-Sheet 1

INVENTOR.
LEWIS H. MOOMAW
BY
James T. Franklin

May 3, 1949.                L. H. MOOMAW                2,468,993
                        MOTION-PICTURE PROJECTOR
Filed Oct. 17, 1946                                5 Sheets-Sheet 2
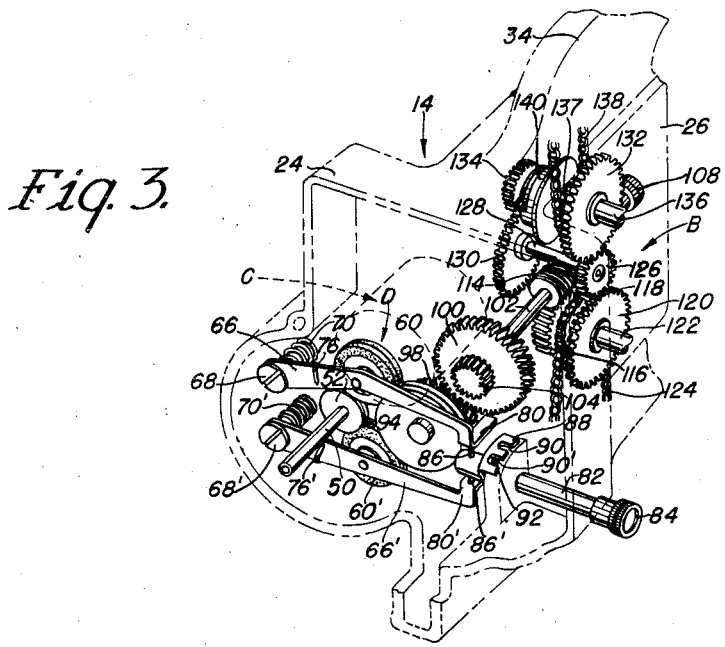
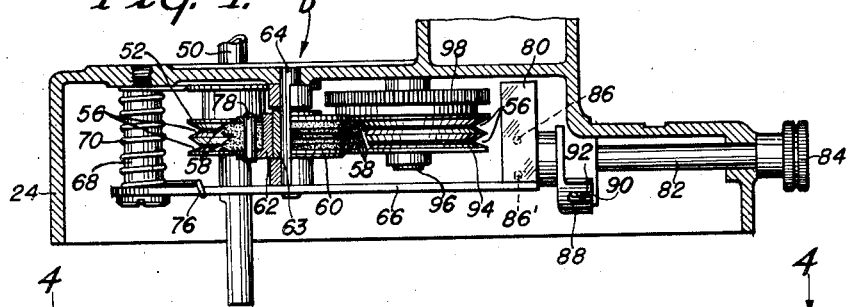
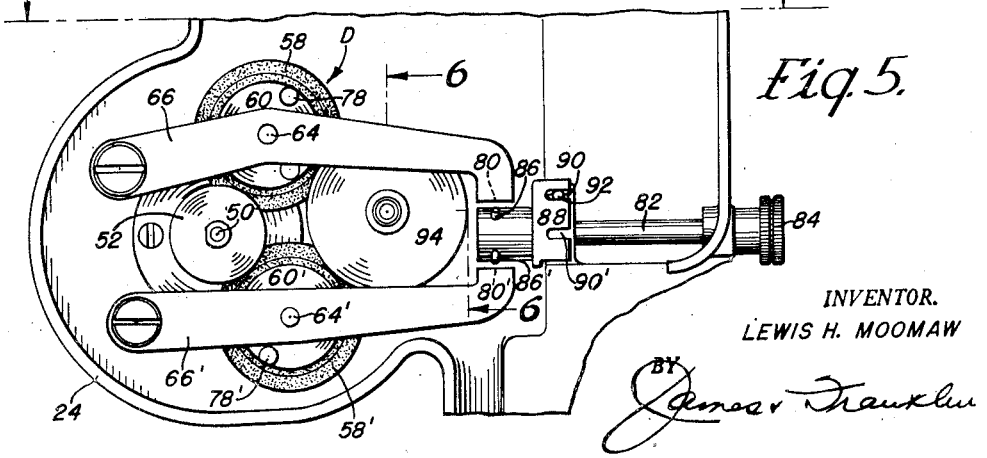
INVENTOR.
LEWIS H. MOOMAW
BY
James Franklin

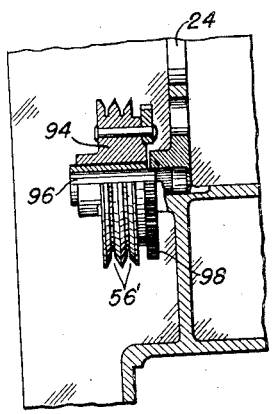
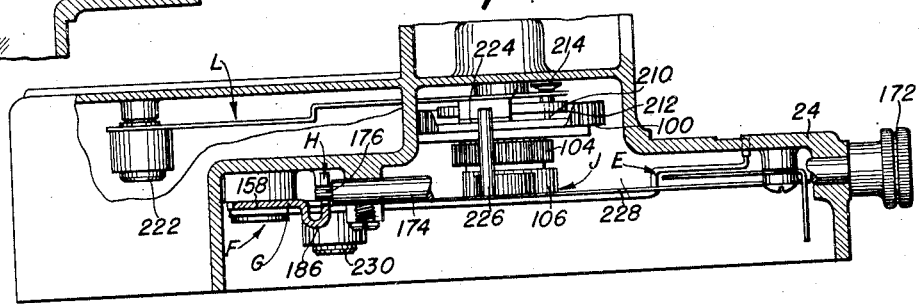
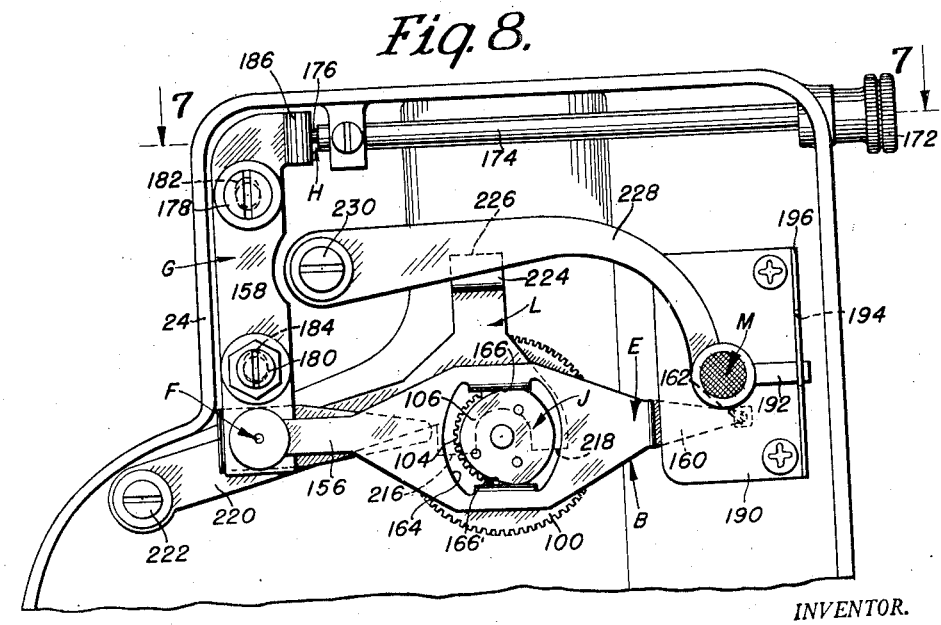

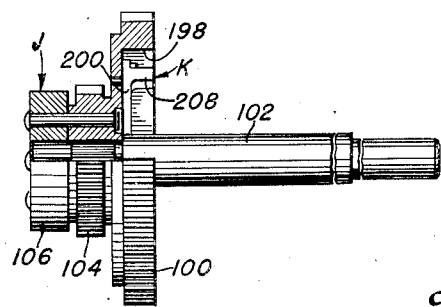
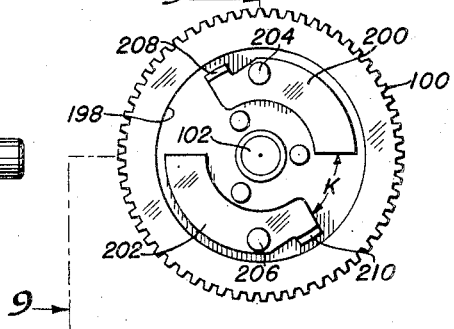
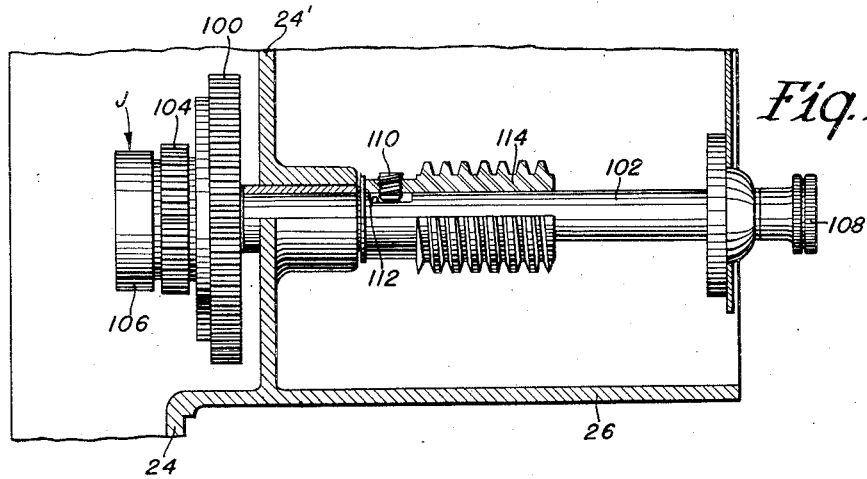
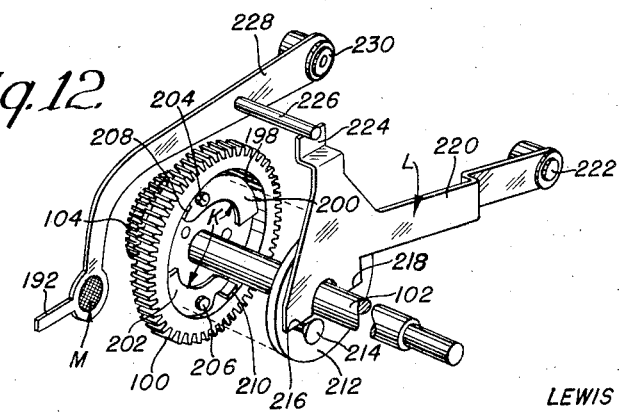

May 3, 1949. L. H. MOOMAW 2,468,993
MOTION-PICTURE PROJECTOR
Filed Oct. 17, 1946 5 Sheets—Sheet 5

INVENTOR.
LEWIS H. MOOMAW

Patented May 3, 1949

2,468,993

UNITED STATES PATENT OFFICE 2,468,993

MOTION-PICTURE PROJECTOR

Lewis H. Moomaw, Great Neck, N. Y., assignor to De Jur-Amsco Corporation, Long Island City, N. Y., a corporation of New York Application October 17, 1946, Serial No. 703,808

15 Claims. (Cl. 88—18.4)

This invention relates to a motion picture projector, and more particularly to the projection machinery therefor.

In motion picture projectors, and particularly in motion picture projectors designed for home use, a single structure includes projection machinery for moving film past an illumination source for projection purposes, a ventilating system for cooling the projector particularly to prevent overheating of the film thereon, the film being at its point of greatest exposure to heat as it passes its projection position, and a motor for driving both the ventilating system and the projection machinery. It is necessary that means be provided to so adjust the projection machinery that during those instants that the film is exposed for projection, the frames thereof correspond to the light passing therethrough so that only a single picture, and not portions of a pair of pictures, is projected at a time. Since it may be desired to stop the motion picture projection in order to exhibit a single frame of the film in still projection, means must also be provided for disconnecting the projection machinery from its driven relationship with the motor. During such time as the film remains stationary and exposed to the full force of the heat emanated by the light source, the projector must provide additional protection from heat therefor lest it be scorched or destroyed.

It is a prime object of the present invention to provide an assembly of projection machinery such that the above features are obtainable in a simple manner.

It is another object of the present invention to provide novel means for disconnecting the projection machinery from the motor so as to permit still rather than moving exhibition of any desired frame.

It is a further object of the present invention to achieve the above in such a manner as to simultaneously obtain increased ventilating action in the projector so as to prevent scorching of the film.

It is still another object of the present invention to provide adjustable framing means controlling the projection machinery so that the whole of a single frame of the film may be projected at a time, and to provide such framing means which may be adjusted by continuous rotation in either direction of a manually operated knob.

It is a still further object of the present invention to provide a fire shutter and control elements associated therewith of such a nature that the fire shutter will interpose itself between the light source and the film when the speed of projection is so slow as to jeopardize the safety of the film if exposed to the full force of the illuminating source, the fire shutter thus acting to aid the increased cooling effect of the ventilating system when the motor has been declutched from the projection machinery.

To the accomplishment of the foregoing objects and such other objects as may hereinafter appear, the present invention relates to the arrangement of the projection machinery as sought to be defined in the appended claims and as described in detail in the accompanying specification taken together with the appended drawings, in which:

Fig. 3 is a schematic view of the transmission system;

Fig. 4 is a view taken along the line 4—4 of Fig. 5;

Fig. 5 is a view taken along the line 2—2 of Fig. 1, but showing only the clutch means as herein embodied;

Fig. 6 is a side view, partially cross-sectioned, of the driven pulley;

Fig. 7 is a view taken along the line 7—7 of Fig. 8;

Fig. 8 is a view taken along the line 2—2 of Fig. 1, but showing only the framing mechanism, fire shutter and associated control apparatus;

Fig. 9 is a view taken along the line 9—9 of Fig. 10;

Fig. 10 is a rear view of the claw arm oscillating means;

Fig. 11 is a side view of the claw arm oscillating means as mounted in the projector housing;

Fig. 12 is an exploded view of the fire shutter and associated control apparatus;

This application describes my invention as embodied in an 8 millimeter home projector, other features of which are described with more particularity in my co-pending applications, Serial No. 703,805 filed October 17, 1946, now Patent Number 2,440,966, issued May 4, 1948, Serial No.

703,806 filed October 17, 1946, and Serial No. 703,807 filed October 17, 1946.

It is to be understood, however, that my invention is not confined specifically to such a projector.

My projector generically comprises a ventilating means A and projection machinery B, both adapted to be driven by the same motor C. A manually operable clutch means D is interposed between the motor C and the projection machinery B so that the projection machinery may be stopped to permit still projection while the motor C continues to rotate. The clutch means D is so constructed that when the projection machinery B is disconnected or declutched from the motor C, the reduction of load on the motor C causes it to rotate more rapidly, whereby the ventilating means A is driven more rapidly, an increased ventilating effect is obtained, and consequently the film is subjected to an increased cooling effect at the very time that that cooling effect is most needed, to wit, when the film is stationary.

As is well-known in the art, it is essential that the film move past the light source in intermittent steps. A film moving element E, here shown as a resilient claw arm, accomplishes this function.

The film moving element E is oscillatable about a pivot F which in turn is mounted on a movable member G so as to be movable within limits inside the projector. By adjustment of the position of the pivot F, the film moving element E can be so coordinated with the remainder of the projection machinery B that the projected images will be "framed," that is to say, projection will take place with respect to but a single frame of the motion picture film at a time, and not with respect to portions of a pair of adjacent frames. The position of the pivot F can, in my projector, be manually adjusted by suitable actuation in either direction of a continuously rotatable member H, so that proper framing may be attained by rotation of the member H in either direction any desired amount, thus eliminating the inconvenience attendant upon conventional framing means which generally employ a screw the rotational freedom of which is limited. With the conventional type of framing mechanism, the operator, if he is uncertain in which direction to rotate the screw in order to frame the projection, will try one direction to its limit and, if effective adjustment is not achieved thereby, must retrace his steps by rotating in the opposite direction. However, with my framing mechanism, rotation in either direction will reciprocate the pivot F in the projector housing and thus will permit accurate framing without any lost motion or retracing of steps.

Figure 2:
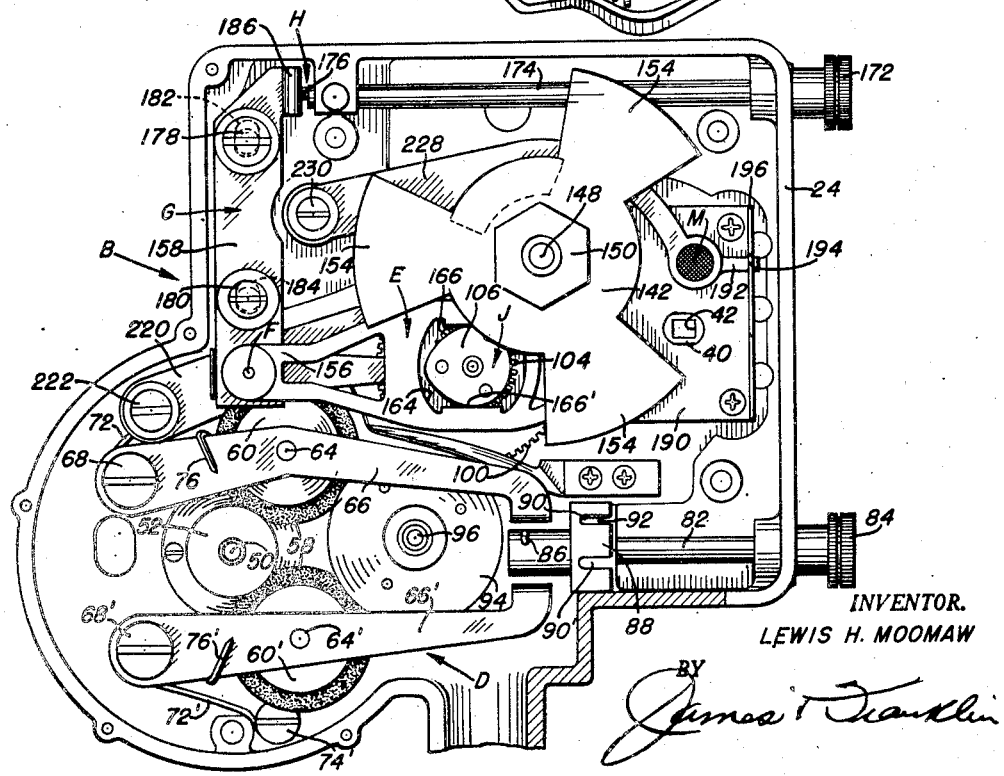
Fig. 2 is a view of the projection machinery taken along the line 2—2 of Fig. 1.

A rotating means J is provided to cause the film moving element E to oscillate about its pivot F. A speed-sensitive centrifugal means K is connected in driven relation with the rotating means J, and is here shown as carried by the rotating means J itself, the means K being active upon positioning means L so as to determine the position which the fire shutter M takes with respect to the film and the illumination lamp (not shown). When the film is projected while moving, a given portion of the film is exposed to the full force of the illumination, and consequently is subjected to its greatest exposure to heat, for only a short period of time. It is therefore not necessary that the fire shutter M be interposed between the film and the light source during such moving projection. To this end the centrifugal means K is so constructed that when the rotating means J is moving at sufficient speed, the centrifugal means K so actuates the positioning means L as to ensure that the fire shutter M is in its raised position, as shown in Fig. 2.

When the motion of the film is stopped for projection of a single frame thereof in still projection, a small portion of the film is exposed to the full force of the illumination for an extended period of time and consequently critical danger of scorching or other damage due to heat exists. During still projection, the rotating means J is stationary and the centrifugal means K, positioning means L and the fire shutter M so co-act that under these conditions the fire shutter M is interposed between the film and the illumination source so as to shield the film from the full force of the illumination and consequently to insulate the film to some degree from the heat emanated from the illumination source. Such a position of the fire shutter M is shown in Fig. 8.

It is to be noted that this action of the fire shutter M acts in aiding conjunction with the ventilating means A, motor C and clutch means D. To operate the projector in still projection, the clutch means D must be so actuated as to disconnect the projection machinery B from the motor C. When this has been done, not only will the rotating means J stop, thus ensuring that the fire shutter M is in its interposed position, but, as has already been described, the reduction of load on the motor C, which remains connected to the ventilating means A, results in an increased ventilating action, and thus in an increased cooling effect.

Having thus described the generic principles involved in my novel ventilation system, I shall now describe a portable home motion picture projector embodying these principles in a very compact and efficient structure. The drawings and the description relate specifically to a projector of my invention adapted to receive 8 millimeter film and hence of comparatively small size, but the principles above set forth may, of course, be employed in movie projectors of other sizes, both portable and non-portable, without departing from the spirit of my invention.

My projector comprises a base 2 in which is housed the various electrical control circuits for the projector, those circuits comprising an illumination circuit for the lamp (not shown), controlled by switch 4, a start and stop circuit for the motor C, controlled by switch 6, and a reversing switch for the motor C, controlled by switch 8. Knob 10 may control a rheostat in the motor circuit so as to control within limits the speed of rotation thereof and consequently the speed of projection. Electrical connection is made to these circuits by means of the contact pins 12. The projector housing proper, generally designated 14, is mounted in the base 2 in such a manner as to be tiltable with respect thereto so as to control the position of the projected image, the knob 16 on the base 2 controlling the tilt.

Figure 1:
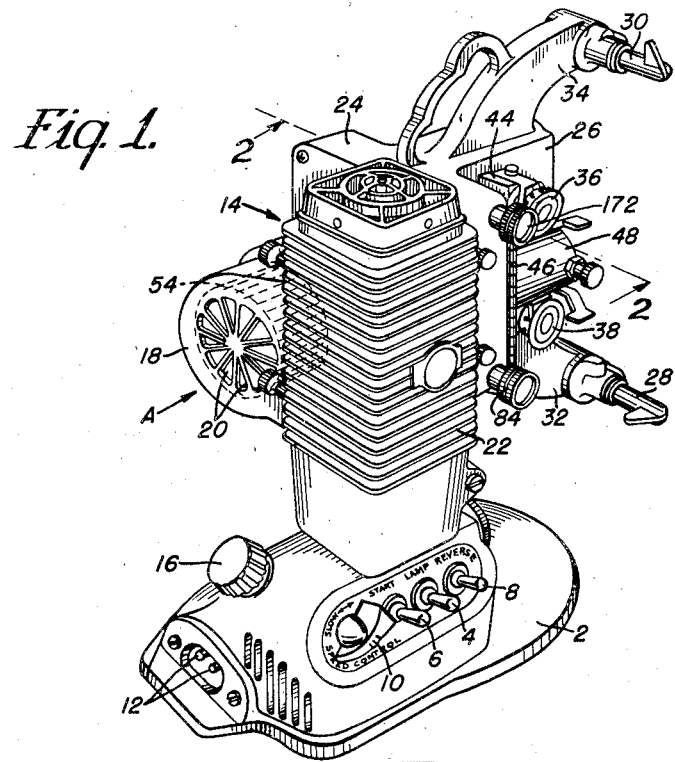
Fig. 1 is a three-quarter rear perspective view of a projector embodying the features of my invention.

The housing 14 comprises a fan housing 18 provided with air inlet orifices 20 in which is disposed a ventilating fan 54 (shown in phantom in Fig. 1), a lamp housing 22 in which is disposed an illumination lamp (not shown), a motor housing in line with the fan housing 18 in which is disposed a motor C, shown in phantom in Fig. 3, a projection machinery housing 24, a gear box housing 26, a pair of reel supports 28 and 30 rotatably mounted at the extremities of reel arms 32 and 34, conventional sprocket assemblies 36 and 38 for guiding the film, an aperture plate 40 having an aperture 42 therein for restricting the light from the illumination lamp to an area equivalent to one frame of the motion picture film and a gate 44 hingedly attached thereto by piano hinge 46 for maintaining the film in contact with the aperture plate 40 and carrying a lens assembly 48 for properly directing and focusing the projected image. All of the above elements may be, except as hereinafter specifically described, of conventional construction insofar as this invention is concerned. Details of various features thereof not more specifically described herein may be found in my co-pending applications for Letters Patent enumerated above.

*Rotation transmitting system and clutch means*

The source of motion for all of the moving parts of my projector is a single motor C, to the drive shaft 50 of which is connected a driving pulley 52 and the fan 54 which comprises part of the ventilating means A. The driving pulley 52 is here shown as provided with a pair of tapered circumferential grooves 56 (see Fig. 4), into which the mating circumferential projections 58 of each of the two friction pulleys 60 and 60' are adapted to project.

Each of the friction pulleys 60, 60' comprise a hub 62 press-fitted over bushing 63, which is freely rotatable on shaft 64 itself in turn carried by arm 66 which is pivotable about screw 68 suitably attached to the projection machinery housing 24. The body of helical spring 70 is wrapped around the screw 68, one end 72 thereof being suitably secured to the frame 24 as by screw 74 and the other end 76 thereof exerting pressure upon the arm 66 in such a direction as to force the friction pulley 60 into contact with the driving pulley 52.

Secured to the hub 62 by means of screw 78 is a body of frictional material such as cork or rubber, the peripheral edges of which are provided with the circumferential projections 58. The force exerted by the spring 70 is sufficient to ensure that the friction between the driving pulley 52 and the friction pulleys 60 and 60' will be of sufficient magnitude so that the former will drive the latter.

The extremities of the arms 66 and 66' terminate in ledges 80 and 80'. Rotatably mounted in the housing 24 so that its projecting extremity is interposed between the ledges 80 and 80' of the arms 66 and 66' is shaft 82, the other end of which projects out through the wall of the housing 24 and has attached thereto an actuating knob 84. The end of the shaft 82 which is interposed between ledges 80 and 80' has disposed thereon a pair of radially projecting pins 86, 86', the projecting lengths of which are sufficient so that when they are disposed perpendicular to the ledges 80, 80' they will spread the arms 66, 66' against the action of the spring 70, 70' and thus move the friction pulleys 60 and 60' out of contact with the driving pulley 52. This position is illustrated in Fig. 3.

The shaft 82 may also carry a shell 88 provided with a pair of notches 90, 90' which cooperate with a spring-loaded detent 92 mounted in the housing 24 in order to ensure positive positioning of the shaft 82 and the pins 86 between a position in which the pins 86, 86' do not make contact with the ledges 80, 80' and a position in which such contact is made and the arms 66, 66' are thereby spread apart.

A driven pulley 94, similar in construction to the driving pulley 52 but optionally differing therefrom in size, is mounted in the housing 24 so as to be rotatable about a shaft 96. The tapered circumferential grooves 56' of the driven pulley 94 are located in line with the similar grooves 56 of the driving pulley 52 and with the frictional circumferential projections 68 of the friction pulleys 60 and 60' so that when the springs 70 and 70' urged the friction pulleys 60 and 60' into frictional contact with the driving pulley 52, similar contact is simultaneously ensured between the friction pulleys 60 and 60' and the driven pulley 94, by which means rotation of the driving pulley 52 is transmitted thereto.

Gear 98 carried by the driven pulley 94 meshes with and drives gear 100 which is in turn rigidly attached to shaft 102, gear 104 and cam 106. The shaft 102 is rotatably supported in the rear wall 24' of the projection machinery housing 24 and projects through the gear box housing 26 to terminate in externally attached knob 108. To that portion of the shaft 102 within the gear box housing 26 is secured, by means of set screw 110 in conjunction with shaft notch 112, a worm gear 114, rotation of which drives gear 116, sprocket wheel 118, gear 120 and shaft 122. To sprocket wheel 118 is attached sprocket chain 124 which drives, through suitable mechanism, the reel support 28. To shaft 122 is attached the sprocket assembly 36.

Gear 120 meshes with and drives idler gear 126, shaft 128 and large idler gear 130. The idler gears 126 and 130 rotate gears 132 and 134, respectively, each at a different speed because of the difference in gear ratios. Gear 132 rotates shaft 136 to which is attached, by means of sprocket gear 137, the sprocket chain 138 which, by suitable mechanism, drives reel support 30. The sprocket gear 137 may be connected in driven relation with either of the gears 132 or 134 by means of speed selection mechanism, generally designated 140, and described with particularity in my aforementioned co-pending application, Serial No. 703,807 filed October 17, 1946.

Since positive gearing connection exists between the driven pulley 94 and the other rotating parts of the projector just described, which parts control the rotation of the reel supports 28 and 30 and the sprocket assemblies 36 and 38, it will be apparent that when the friction pulleys 60 and 60' make contact between the driving pulley 52 and the driven pulley 94, the film in the projector will be caused to move until, by rotation of the knob 84, the pins 86 in conjunction with the ledges 80 and 80' move the friction pulleys 60 and 60' away from frictional connection with the driving pulley 52 and the driven pulley 94, at which time motion of the film through the projector will cease. Selection of the desired frame for still projection can be effected by rotation of the knob 108 and will have the effect of manually moving the projection machinery without the aid of the motor. It is therefore apparent that the friction pulleys 60 and 60' and the means by which they are mounted in the projector comprise the clutch means D which may be positively actuated by the rotation of the knob 84 through but a small angle and which, when actuated so as to declutch the projection machinery from the driving pulley 52, thus remove the load of the projection machinery from the motor C, enabling the motor to rotate more rapidly and thus to drive the fan 54 at increased speed, achieving an increased cooling effect within the projector.

Framing mechanism

As is well-known, projection of motion pictures is accomplished by the successive projection of a large number of separate pictures, each for a small period of time. It is, therefore, necessary that the film be moved past the light aperture 42, through which passes light from the illumination source, not at a continuous speed but in a series of discrete steps or jerks. It is further necessary that light be permitted to pass through the film to the projection screen only during such instants as the film is stationary, and it has been found that smoothness of projection is enhanced if, during the period that the film is stationary, a series of short light pulses be permitted to pass through it.

Figure 14:
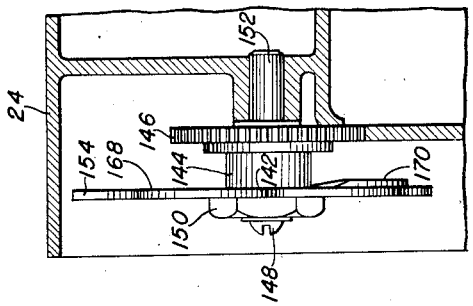
Fig. 14 is a side view thereof, taken along the line 14—14 of Fig. 13, showing it mounted in the projector housing.
Figure 13:
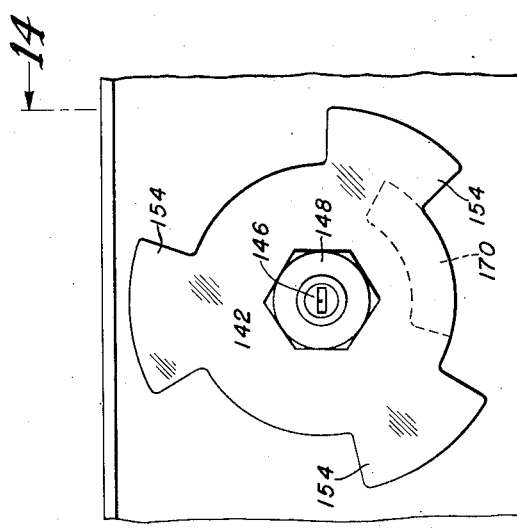
Fig. 13 is a front view of the rotating element which acts as the shutter.

To this end, my projector includes a rotating element 142 (see Figs. 2, 13 and 14) attached to hub 144 and gear 146 by means of screw 148 and lock nut 150, the entire assembly being freely rotatable upon shaft 152 mounted in the rear of the projection machinery housing 24. The gear 146 engages with and is driven by the gear 104. The rotating element 142 is provided with a plurality of blades 154 of size sufficient to interpose themselves, as the element 142 rotates, between the illumination source and the light aperture 42 (see Fig. 2) thereby alternately interrupting and permitting the passage of light through the aperture 42. The blades 154 consequently act as the shutter for the projector.

In order to control the movement of the film past the light aperture 42, a film moving element E is provided, here shown in the form of a claw arm formed of a resilient material such as spring steel. One end 156 of the film moving element E is so connected to bar 158 mounted within the projection machinery housing 24 as to be pivotable with respect thereto about a pin F which defines the pivot therefor. The other end 160 of the film moving element E projects out through an aperture 162 in a wall of the housing 24 and has a pair of claws (not shown) thereon to engage with the sprocket holes of the film and thus positively control the motion of the film past the light aperture 42.

The central portion of the film moving element E is cut out as at 164 and is provided with a pair of bearing surfaces 166, 166' which receive and fit snugly against the periphery of the cam 106. The cam 106 is eccentrically mounted upon the shaft 102 and is so shaped that rotation of the cam 106 will cause the film moving element E to oscillate about its pivot F and thus cause the claws on the end 160 thereof to move up and down, two complete oscillations of the film moving element E being produced for every complete rotation of the cam 106.

In order to permit the claws on the end of the film moving element E to disengage themselves from the sprocket holes in the film at suitable intervals and also in order to permit the passage of a plurality of pulses of light to pass through the film during each of its stationary positions, the film moving element E is so positioned and constructed as to have its end 160 resiliently urged away from the film in the projector and into contact with the underside 168 of the rotating element 142. As will be apparent from an inspection of Figs. 13 and 14, one segment of the outer portion of the underside 168 of the rotating element 142 is provided with a raised cam surface 170. When the cam surface 170 comes into contact with the film moving element E, the element E will be bent toward the film an amount sufficient for the claws on the end 160 thereof to engage with the sprocket holes and move the film an amount sufficient to bring the next succeeding frame of the film into correspondence with the light aperture 42.

It will therefore be apparent that the precise position that the film takes up during any movement of the projector with respect to the light aperture 42 is controlled by the precise position of the film moving element E with respect to the other projection machinery. It often occurs that the film is positioned so that the light aperture 42 does not coincide with a complete frame or single picture on the film but rather coincides with parts of a pair of adjacent frames. It is consequently necessary to provide means for "framing" the film in order that the whole of a single picture and not parts of a pair of adjacent pictures be projected at any one time. The framing means here employed achieves adjustability by altering the position within the projector housing of the pivot F of the film moving element E. All prior framing mechanisms of this nature have the drawback that actuation of the manual control means therefor in a given direction will achieve only a limited change in the position of the pivot F and should such change, when carried to its limit, prove insufficient properly to frame the film, the control means must thereupon be moved in its opposite direction in order that framing might be effectuated.

I eliminate the necessity for such false starts and lost time and energy by providing a framing mechanism manually actuatable by means of knob 172, which knob may be turned in either direction an unlimited amount in order to achieve full framing action in both directions.

To that end the shaft 174, to which the knob 172 is attached, has projecting from its extremity a pin 176 eccentrically mounted thereon (see Figs. 2 and 8) which constitutes the continuously rotatable member H.

The bar 158 to which the film moving element E is attached by means of pivot F is itself secured to the projection machinery housing 24 by means of screws 178 and 180 which pass through elongated slots 182 and 184 in its body, the bar 158 thus constituting the movable member G previously referred to. The upper end of the bar 158 is provided with an inwardly bent forked projection 186 between the tines of which projects the pin 176. Therefore, rotation of the knob 172 and consequent rotation of the pin 176 will cause the bar 158 to reciprocate within the housing 24 and thus the position of the pivot F of the film moving element E will be varied between its extreme positions.

Fire shutter and positioning means therefor

The fire shutter M is adapted to cover the light aperture 42 by interposing itself between the aperture 42 and the illumination source when the motion of the film past the aperture 42 has either stopped or is of such a low velocity as to expose the film to extreme danger of damage from heat. The shutter M is a perforated metal plate, through the perforations of which a restricted amount of light may pass, thus permitting still projection but restricting the amount of heat to which the film is subjected, and is movable over its supporting plate 190 between its position shown in Fig. 2, where it does not obstruct the light aperture 42, and its position shown in Fig. 8 where it does. It is provided with a projecting lug 192 which extends through a slot 194 in an upturned flange 196 on the plate 190 and positively limits the freedom of motion of the shutter M.

The gear 198, attached to shaft 102, is countersunk as at 198 (see Figs. 9, 10 and 12) and a pair of arms 200 and 202 are mounted in said countersunk section 198 so as to be pivotable about pins 204 and 206. The arms 200 and 202 are each mounted on the pins 204 and 206 in an unbalanced condition so that when the gear 198 rotates, the heavier ends of the arms 200 and 202 will be centrifugally forced outward causing the arms 200 and 202 to pivot about the pins 204 and 206. The lighter ends of each of the arms 200 and 202 are here shown as provided with upstanding fingers 208 and 210.

A disc 212 (see Fig. 12) provided with pin 214 is loosely mounted on shaft 102 so as to be independently rotatable with respect thereto and is of such a diameter as to be loosely receivable between the fingers 208 and 210 of the arms 200 and 202 (see dotted lines of Fig. 12).

If the gear 198 is either stationary or is rotating at an exceedingly low speed, the fingers 208 and 210 will have no effect of any consequence on the disc 212. However, as soon as the speed of rotation of the gear 198 becomes sufficient to cause the arms 200 and 202 to pivot about the pins 204 and 206, the fingers 208 and 210 will come in contact with and grasp the periphery of the disc 212 and will tend to rotate the disc 212 along with themselves.

As the disc 212 is thus rotated, the pin 214, carried thereby, will come into contact with one or the other of the shoulders 216 or 218 of the arm 220 which is mounted on the housing 24 so as to be rotatable about pin 222. The arm 220 is provided with an upwardly projecting portion 224 which, when raised by the action of the pin 214 on shoulder 216 or 218, comes in contact with and raises pin 226 attached to arm 228 which is pivotable at one extremity about pin 230 and which carried at its other extremity the fire shutter M.

The upward motion of the fire shutter M is limited by contact of the lug 192 attached thereto with the upper end of the slot 194 in which it rides. Consequently, the upward motion of the pin 226 and the arm 220 is similarly limited and therefore rotation of the disc 212 beyond that sufficient to lift the fire shutter M to its position shown in Fig. 2 is positively prevented. The gear 198 continues to rotate, the fingers 208 and 210 continuing to grasp and slide over the periphery of the disc 212 and continually exert frictional force thereupon to maintain the fire shutter M in its raised position.

Should the gear 198 cease turning, as for example if the clutch means D were actuated to declutch the projection machinery from the driving pulley 52, or if for any reason the speed of rotation of the gear 198 should fall below that which ensures safety of the film from adverse heat effects, the frictional force exerted by the fingers 208 and 210 on the disc 212 would no longer be sufficient to overcome the combined weights of the pin 214, the arm 220, the pin 226, the arm 228 and the fire shutter M, and consequently all of those elements would fall to their lower position as shown in Fig. 8, the downward motion of the arm 220 being limited by the shaft 102 and the downward motion of the fire shutter M being limited by the engagement of the lug 192 with the bottom of the slot 194 in which it rides.

The operation and interaction of the various elements of the projection machinery which I have described will in the main be fully apparent from the above recital. It will be apparent that many changes in detail may be made therein without departing from my invention as set forth with more particularity in the appended claims:

I claim:

1. A motion picture projector comprising a frame, ventilating means therein, a claw arm oscillatably mounted therein for moving the film, a rotating means active upon said claw arm to oscillate the same, a motor connected to drive both the ventilating means and a driving pulley, a driven pulley connected to drive said rotating means, a friction pulley movable between a first position for moving picture projection in which it makes contact with and connects the driving pulley and the driven pulley and a second position for still picture projection in which it does not make contact with both the driving and driven pulleys, a fire shutter movable within said frame between a first position for moving projection and a second position for still projection, centrifugal means in driven connection with said rotating means, and positioning means normally placing said fire shutter in its second position and actuatable by said centrifugal means when the rotating means exceeds a critical rotational speed to place said fire shutter in its first position, whereby when said friction pulley is in its first position for moving picture projection the motor drives the ventilating means, oscillates the claw arm to move the film, and causes the fire shutter to be placed in its first position, and when said friction pulley is in its second position for still picture projection the motor drives the ventilating means at increased speed so as to increase the cooling effect thereof and hence increase the safe duration of still picture projection, the claw arm is not oscillated so that the film is still, and the fire shutter is caused by its positioning means to assume its second position.

2. A motion picture projector comprising a frame, ventilating means therein, a claw arm mounted therein so as to be oscillatable about a pivot for moving the film, a rotating means active upon said claw arm to oscillate the same, means for varying the position of said claw arm pivot comprising a movable member which carries said claw arm pivot and a continuously rotatable member active upon said movable member to position the same, a motor connected to drive both the ventilating means and a driving pulley, a driven pulley connected to drive said rotating means, a friction pulley movable between a first position for moving picture projection in which it makes contact with and connects the driving pulley and the driven pulley and a second position for still picture projection in which it does not make contact with both the driving and driven pulleys, a fire shutter movable within said frame between a first position for moving projection and a second position for still projection, centrifugal means in driven connection with said rotating means, and positioning means normally placing said fire shutter in its second position and actuatable by said centrifugal means when the rotating means exceeds a critical rotational speed to place said fire shutter in its first position, whereby when said friction pulley is in its first position for moving picture projection the motor drives the ventilating means, oscillates the claw arm to move the film, and causes the fire shutter to be placed in its first position, the position of the claw arm pivot being at the same time adjustable to frame the film being projected, and when said friction pulley is in its second position for still picture projection the motor drives the ventilating means at increased speed so as to increase the cooling effect thereof and hence increase the safe duration of still picture projection, the claw arm is not oscillated so that the film is still, and the fire shutter is caused by its positioning means to assume its second position.

3. An adjustable framing mechanism for a motion picture projector including a housing, a film moving element and an actuating means for said element oscillatable about a pivot; said mechanism comprising a movable member which carries said pivot and a member manually rotatable in a given direction an unlimited number of revolutions and active upon said movable member to reciprocate the same between its limits of motion upon rotation of said manually rotatable member in a single direction and thus adjust the framing of the film in said projector.

4. An adjustable framing mechanism for a motion picture projector including a housing, a film moving element and an actuating means for said element oscillatable about a pivot; said mechanism comprising a member movable within limits within said housing which carries said pivot and a member manually rotatable in a given direction, and an eccentric connection between said rotatable member and said movable member to reciprocate the latter between its limits of motion upon rotation of said rotatable member in a single direction, thereby adjusting the framing of the film in said projector.

5. An adjustable framing mechanism for a motion picture projector including a housing, a film moving element and an actuating means for said element oscillatable about a pivot; said mechanism comprising a movable member which carries said pivot, a member manually rotatable in either direction an unlimited number of revolutions and active upon said movable member to reciprocate the same between its limits of motion upon rotation of said manually rotatable member in a single direction and thus adjust the framing of the film in said projector.

6. An adjustable framing mechanism for a motion picture projector including a housing, a film moving element and an actuating means for said element oscillatable about a pivot; said mechanism comprising a member movable within limits within said housing which carries said pivot, a member manually rotatable in either direction, and an eccentric connection between said rotatable member and said movable member to reciprocate the latter between its limits of motion upon rotation of said rotatable member in a single direction, thereby adjusting the framing of the film in said projector.

7. An adjustable framing mechanism for a motion picture projector including a housing, a film moving element and an actuating means for said element oscillatable about a pivot; said mechanism comprising a movable member which carries said pivot and a member accessible from the outside of said housing and manually rotatable in a given direction an unlimited number of revolutions and active upon said movable member to reciprocate the same between its limits of motion upon rotation of said manually rotatable member in a single direction and thus adjust the framing of the film in said projector.

8. An adjustable framing mechanism for a motion picture projector including a housing, a film moving element and an actuating means for said element oscillatable about a pivot; said mechanism comprising a member movable within limits within said housing which carries said pivot, a member accessible from the outside of said housing and manually rotatable in a given direction, and an eccentric connection between said rotatable member and said movable member to reciprocate the latter between its limits of motion upon rotation of said rotatable member in a single direction, thereby adjusting the framing of the film in said projector.

9. An adjustable framing mechanism for a motion picture projector including a housing, a film moving element and an actuating means for said element oscillatable about a pivot; said mechanism comprising a movable member which carries said pivot, a member accessible from the outside of said housing and manually rotatable in either direction an unlimited number of revolutions and active upon said movable member to reciprocate the same between its limits of motion upon rotation of said manually rotatable member in a single direction and thus adjust the framing of the film in said projector.

10. An adjustable framing mechanism for a motion picture projector including a housing, a film moving element and an actuating means for said element oscillatable about a pivot; said mechanism comprising a member movable within limits within said housing which carries said pivot, a member accessible from the outside of said housing and manually rotatable in either direction, and an eccentric connection between said rotatable member and said movable member to reciprocate the latter between its limits of motion upon rotation of said rotatable member in a single direction, thereby adjusting the framing of the film in said projector.

11. A motion picture projector comprising a housing a claw arm for controlling the motion of the film. actuating mechanism for said claw arm, a pivot to which said actuating mechanism is oscillatably connected, and adjustable framing mechanism comprising a member mounted in said housing so as to be slidable within limits and carrying said pivot and a cam continuously manually rotatable in a given directon and active upon said member to slidably position the same in said housing and thus position said pivot, thereby adjusting the framing of the film in said projector.

12. A motion picture projector comprising a housing, a claw arm for controlling the motion of the film, actuating mechanism for said claw arm, a pivot to which said actuating mechanism is oscillatably connected, and adjustable framing mechanism comprising a member mounted in said housing so as to be slidable within limits and carrying said pivot and a cam continuously manually rotatable in a given direction and active upon said member to reciprocate it between its limits of motion and hence position said pivot, thereby adjusting the framing of the film in said projector.

13. A motion picture projector comprising a housing, a claw arm for controlling the motion of the film, actuating mechanism for said claw arm, a pivot to which said actuating mechanism is oscillatably connected, and adjustable framing mechanism comprising a member mounted in said housing so as to be slidable within limits and carrying said pivot and a cam operable from the exterior of said housing, continuously manually rotatable in a given direction, and active upon said member to reciprocate it between its limits of motion and hence position said pivot, thereby adjusting the framing of the film in said projector.

14. A motion picture projector comprising a housing, a claw arm for controlling the motion of the film, actuating mechanism for said claw arm, a pivot to which said actuating mechanism is oscillatably connected, and adjustable framing mechanism comprising a member mounted in said housing so as to be slidable within limits and carrying said pivot and a cam operable from the exterior of said housing, continuously manually rotatable in either direction, and active upon said member to reciprocate it between its limits of motion and hence position said pivot, thereby adjusting the framing of the film in said projector.

15. A motion picture projector comprising a housing, a claw arm for controlling the motion of the film, a pivot to which said claw arm is oscillatably connected, and adjustable framing mechanism comprising a bar slidably mounted in said housing and carrying said pivot, a rotatable knob mounted on the outside of said housing and continuously manually rotatable in either direction, and an eccentric in said housing rotatable by said knob and engageable with said bar, rotation of said knob rotating said eccentric and reciprocating said bar within said housing, thus varying the position of said pivot, whereby framing adjustment of said claw arm from one extreme to the other and back again is accomplished through continued rotation of said knob in either direction.

LEWIS H. MOOMAW.

REFERENCES CITED

The following references are of record in the file of this patent:

UNITED STATES PATENTS

| Number | Name | Date |
| --- | --- | --- |
| 940,275 | Pink et al. | Nov. 16, 1909 |
| 1,227,887 | Connor et al. | May 29, 1917 |
| 1,846,004 | Green | Feb. 16, 1932 |
| 1,889,149 | Marks | Nov. 29, 1932 |
| 1,926,862 | Wellman | Sept. 12, 1933 |
| 1,982,739 | Kaden et al. | Dec. 4, 1934 |
| 2,190,653 | Githens et al. | Feb. 20, 1940 |
| 2,259,591 | Sperry | Oct. 21, 1941 |
| 2,281,726 | Stechbart | May 5, 1942 |
| 2,282,863 | Githens et al. | May 12, 1942 |
| 2,302,811 | Stechbart | Nov. 24, 1942 |
| 2,335,435 | Morgan et al. | Nov. 30, 1943 |
| 2,335,436 | Morgan et al. | Nov. 30, 1943 |